Dec. 5, 1950    J. I. LARMAN    2,532,412
TIRE REMOVING DEVICE

Filed Oct. 28, 1949    2 Sheets-Sheet 1

INVENTOR.
JAMES I. LARMAN
BY
McMorrow, Berman & Davidson
ATTORNEYS

Dec. 5, 1950   J. I. LARMAN   2,532,412
TIRE REMOVING DEVICE
Filed Oct. 28, 1949   2 Sheets-Sheet 2

INVENTOR.
JAMES I. LARMAN
BY
McMorrow Berman & Davidson
ATTORNEYS

Patented Dec. 5, 1950

2,532,412

UNITED STATES PATENT OFFICE 2,532,412

TIRE REMOVING DEVICE

James I. Larman, Kensett, Ark.

Application October 28, 1949, Serial No. 124,086

4 Claims. (Cl. 157—1.2)

My invention relates to a device for removing tires from wheel rims.

A primary object of my invention is to provide a device for effectively removing heavy truck and bus tires from their rims with a minimum of effort and without damaging the tire casings.

A further object is to provide a device of the type mentioned which may be either manually or power operated.

A further object is to provide a tire removing device including means operable to first break the "freeze" between the tire casing and rim, and then pull the rim out of the casing.

A still further object of my invention is to provide a large tire removing device which is highly simplified, extremely strong, and relatively inexpensive to build.

Other objects and advantages of my invention will be apparent during the course of the following description.

Figure 1:
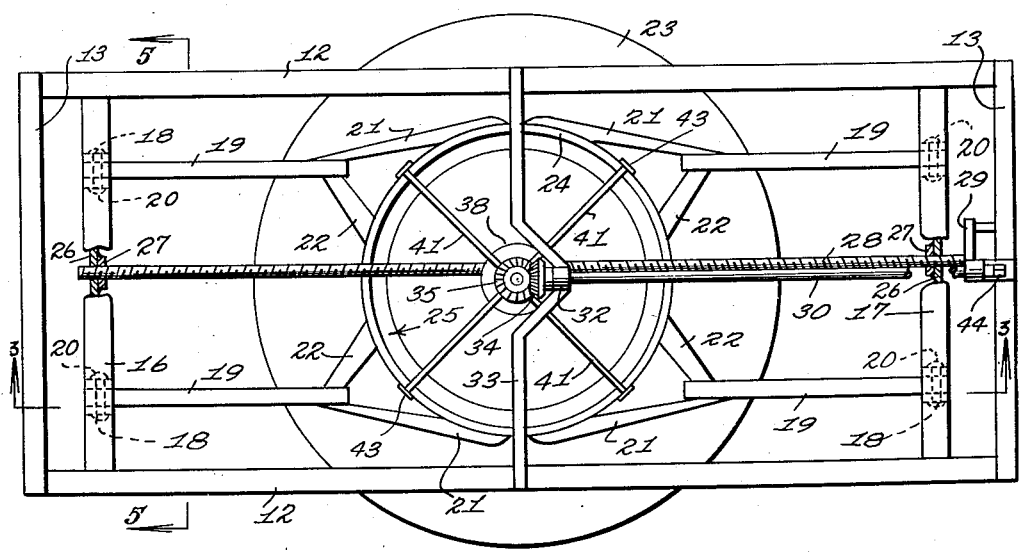
Figure 2:
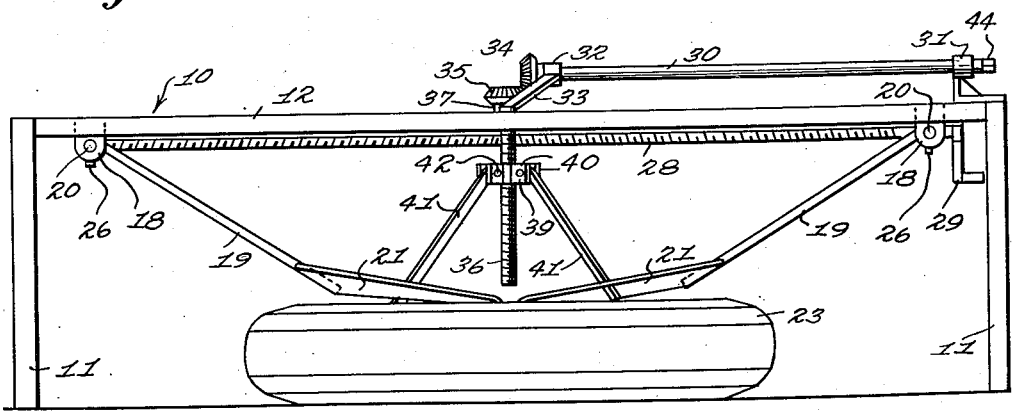
Figure 7:
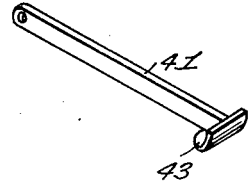
Figure 8:
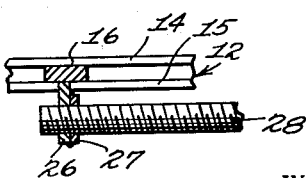
Figure 3:
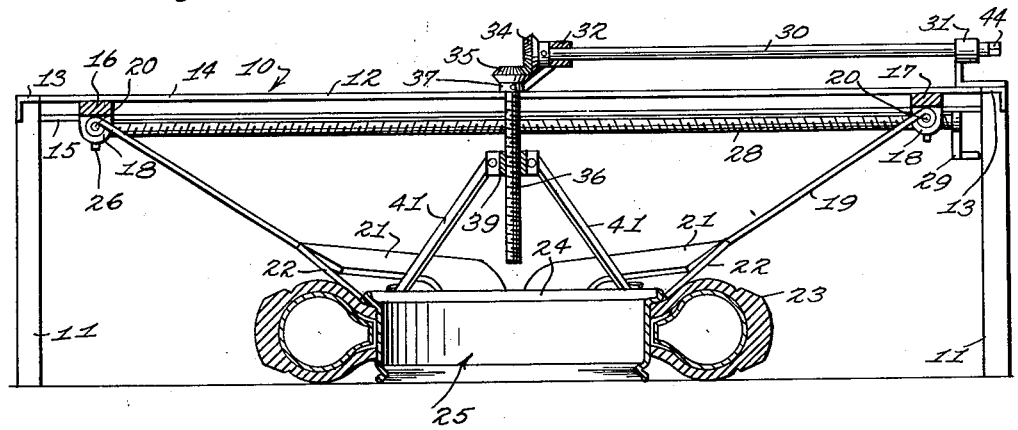
Figure 4:
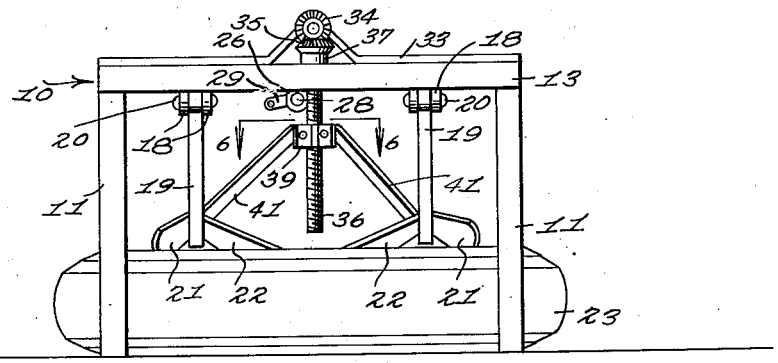
Figure 5:
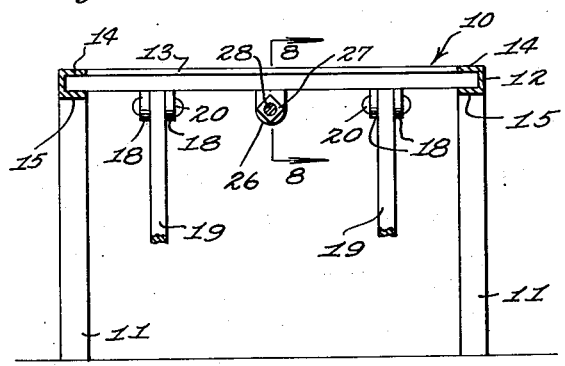
Figure 6:
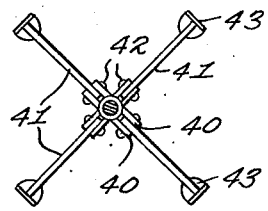

In the accompanying drawings, forming a part of this application, and in which like numerals are employed to designate like parts throughout the same, Figure 1 is a plan view of a tire removing device embodying my invention, Figure 2 is a side elevation of the same, Figure 3 is a longitudinal vertical section, taken on line 3—3 of Figure 1, Figure 4 is an end elevation of the device, Figure 5 is a transverse vertical section, taken on line 5—5 of Figure 1, Figure 6 is a fragmentary horizontal section taken on line 6—6 of Figure 4, parts omitted, Figure 7 is a perspective view of a rim pulling arm removed, and, Figure 8 is an enlarged fragmentary vertical section taken on line 8—8 of Figure 5, parts omitted.

In the drawings, where for the purpose of illustration is shown a preferred embodiment of my invention, the numeral 10 designates generally an elevated support or table which is elongated and rectangular and provided at its four corners with vertical legs 11. The table 10 has its top generally open and includes longitudinal side rails or channels 12 and transverse horizontal end bars 13, formed of angle iron or the like, and rigidly secured to the ends of the channels 12. The channels 12 are parallel and horizontal and have their upper and lower horizontal longitudinal webs 14 and 15 projecting inwardly in opposed relation to form longitudinal guides or tracks for longitudinally shiftable transverse slide plates or bars 16 and 17, which have their opposite ends slidably engaging between the webs 14 and 15, Figure 5.

The slide plates 16 are provided inwardly of and near the channels 12 with pairs of spaced depending apertured lugs 18, integral therewith, and these lugs are pivotally connected with the upper ends of longitudinally extending parallel vertically swingable straight arms or bars 19, by means of pins 20, or the like. The arms 19 of the bars 16 and 17 are in longitudinal alignment and extend toward the longitudinal center of the table 10 and are inclined downwardly toward the longitudinal center of the table, Figure 2. Rigidly secured to the lower free ends of the bars 19, by welding or the like, are pairs of diverging generally flat, wide blades 21 and 22. The blades 21 extend generally longitudinally of the bars 19 and are adapted to have their inner longitudinal edges engage between the sides of a tire casing 23 and the usual bead 24 of a rim 25 of conventional construction. The blades 21 are arranged at a slight angle to the longitudinal center lines of the bars 19 and extend toward the channels 12 and toward the longitudinal center of the table 10, Figure 1. Near the longitudinal center of the table 10, the free ends of the blades 21 of each pair of longitudinally aligned bars 19 are arranged close together and engage between the rim bead 24 and the side of the tire casing 23 upon opposite sides of the tire casing and substantially at diametrically opposite points, Figure 1. The inner blades 22 are arranged at a greater angle to the longitudinal center lines of the bars 19 than the angles between the blade 21 and such arms, and the free ends of the blade 22 are adapted to engage between the rim bead 24 and side of the tire casing 23 at points substantially 90° away from the points at which the blades 21 engage the rim bead and tire casing, Figure 1. The blades 22 are somewhat shorter than the blades 21 as clearly shown in Figure 1, and the blades 21 and 22 have substantial lengths of contact with the rim bead 24 so that a large circumferential length of the side of the tire casing may be separated from the rim 25 by the blades 21 and 22.

At their longitudinal centers, the slide plates 16 have integral depending screw threaded lugs 26, arranged in axial alignment, and having screw threaded nuts 27 rigidly secured to their inner opposed faces, Figure 8. A horizontal longitudinally extending screw threaded bar 28 is arranged below the slide bars 16 and 17 and engages within the screw threaded lugs and nuts 26 and 27 of the slide bars, the bar or shaft 28 has right-hand threads extending from its longitudinal center toward one end, and left-hand threads extending from its longitudinal center toward its opposite end, so that when the shaft 28 is turned upon its longitudinal axis the transverse slide bars 16 and 17 will move toward each other and toward the longitudinal center of the table 10. The screw threaded shaft 28 extends longitudinally slightly beyond the slide bar 17 and is provided with a crank handle 29.

Arranged above the top of the table 10 and substantially directly over the shaft 28 and extending longitudinally of and parallel to the shaft 28, is a horizontal shaft 30 journalled at its outer end in a fixed bearing 31 secured to the top of the right-hand bar 13, Figure 1. The inner end of the shaft 30 is disposed substantially at the longitudinal center of the table and is journalled within a fixed bearing 32, integral with a transverse support bar 33 which extends transversely across the table and has its ends rigidly secured to the channels 12 at their longitudinal centers. The rotatable shaft 30 has secured to it inwardly of the bearing 32, a first bevelled gear 34 which meshes with a second vertically disposed bevelled gear 35 secured to the top of a vertically disposed screw threaded shaft 36, arranged at the longitudinal and transverse centers of the table and directly above the center of the rim 25 which may rest upon the floor beneath the table 10. The hub 37 of the bevelled gear 35 engages upon a horizontally disposed thrust plate or bearing 38, rigidly secured to the support bar 33 so that the screw threaded shaft 36 is held against downward movement. Mounted upon the screw threaded shaft 36 is a spider nut 39 having pairs of radial arms 40, pivotally connected with the top ends of straight depending rim pulling arms 41, as shown at 42. Rigidly secured to the lower free ends of the arms 41 are curved plates or cleats 43 for engaging about the periphery of the rim bead 24, after the side of the tire casing 23 has been pressed away from the bead by the plates 21 and 22. The arms 41 are freely swingable vertically and the nut 39 is adapted to move vertically upon the screw threaded shaft 36 when such shaft is turned. The bevelled gears 34 and 35 are held by the connected bar 33 and thrust plate 38 in permanent mesh. The shaft 30 has an outer extension 44 adjacent to the bearing 31, which may be squared for the reception of a hand crank or the like. The shaft 30 may be power operated if desired.

The operation of the tire removing device is as follows.

The wheel rim 25 having the tire casing 23 thereon is arranged below the table 10 as shown and is centered directly beneath the screw shaft 36. The freely swingable arms 19 may be lifted to permit the introduction of the rim and tire casing and the slide plates 16 and 17 are roughly adjusted by turning the crank 29, so that the blades 21 and 22 will engage between the rim bead 24 and one side of the casing 23, Figures 1 and 3. By previous adjustments of the slide plates or bars 16 and 17, the blades 21 and 22 can be made to accommodate any size rim and tire. The nut 39 may be roughly adjusted at this time, if desired, by turning the shaft 30, for driving the screw shaft 36, which will move the nut 39. The cleats 43 may thus be brought into position where they will drop beneath the rim bead 24 as soon as the freeze between the tire casing 23 and rim has been broken by the plates 21 and 22. With these preliminary adjustments completed, the crank 29 is further turned for shifting the slide plates 16 and 17 toward each other. This action forces the free ends of the blades 21 and 22 downwardly between the rim bead 24 and upper side of the casing 23, to break the freeze between the casing and rim. When this freeze is broken the upper side of the tire casing will shift downwardly from the rim bead 24, Figure 3, and the curved cleats 43 will encircle the rim bead. The shaft 30 is then turned manually or by power for drawing the nut 39 upwardly on the screw shaft 36. This action will cause the arms 41 and cleats 43 to pull the rim 25 bodily out of the tire casing. The arms 41 and 19 will always tend to swing downwardly due to gravity, and when the slide plates 16 and 17 are drawn together the blades 21 and 22 will naturally enter between the bead 24 and tire casing and force the top side of the tire casing downwardly. Due to the large contact length between the free ends of the blades 21 and 22 and tire casing, there is very little danger of punching or damaging the tire casing when breaking the freeze between it and the rim. When the nut 39 travels upwardly, the arms 41 tend naturally to swing together at their lower ends, so that the bead 24 will be tightly gripped by the cleats 43. The device is simple, and positive in operation and will effectively remove large tire casings from their rims.

It is to be understood that the form of my invention herewith shown and described is to be taken as a preferred example of the same, and that various changes in shape, size and arrangement of parts may be resorted to, without departing from the spirit of the invention or the scope of the subjoined claims.

Having thus described my invention, what I claim is:

1. A device for removing a tire casing from a rim having a bead, comprising a table to be arranged over the tire casing and rim, opposed longitudinally slidable plates slidably mounted upon the table for movement toward and from each other, mechanical means connected with the slidable plates to move them, bars pivotally connected with the slidable plates and extending below the table and having parts for engagement between the bead of the rim and tire casing, a vertically disposed screw shaft mounted upon the table above the tire casing and rim and disposed at the centers thereof, a nut mounted upon the screw shaft for vertical movement when the screw shaft rotates, vertically swingable arms connected with the nut and having parts to engage about the rim bead for pulling the rim out of the tire casing when the nut moves upwardly, and mechanical means to rotate the screw shaft.

2. A device for removing a tire casing from a rim having a bead, comprising a table to be arranged over the tire casing and rim, opposed horizontally slidable plates connected with the table for movement toward and from each other, mechanical means connected with the plates to move them, pairs of aligned vertically swingable bars pivotally connected with the plates and extending below the table, pairs of diverging blades secured to the lower end of the bars and constructed and arranged for engagement between the rim bead and tire casing at points about the circumference of the rim bead, a vertically disposed screw shaft mounted upon the table above the tire casing and rim, a nut mounted upon the screw shaft for vertical movement when the screw shaft rotates, vertically swingable arms pivotally connected with the nut and having parts to engage the rim bead for pulling the rim bodily out of the tire casing when the nut moves upwardly, and mechanical means to rotate the screw shaft.

3. A device for removing a tire casing from a rim having a bead, comprising a table to be arranged over the tire casing and rim and including side longitudinal guide rails, opposed transverse horizontally shiftable bars slidably mounted upon the guide rails for longitudinal movement toward and from each other, a longitudinally extending screw shaft having screw threaded engagement with the horizontally shiftable bars and turnable for drawing the bars together and separating the same, pairs of aligned vertically swingable bars pivotally connected with the horizontally shiftable bars and extending below the table, pairs of diverging blades secured to the lower ends of the bars and arranged for engagement between the rim bead and casing at points about the circumference of the casing, a vertically disposed screw shaft mounted upon the table above the tire casing and rim, a nut mounted upon the screw shaft for vertical movement when the screw shaft rotates, vertically swingable arms pivotally connected with the nut and having parts to engage the rim bead for pulling the rim out of the tire casing, and mechanical means to rotate the screw shaft.

4. A device for removing a tire casing from a rim having a bead, comprising a table for arrangement over the tire casing and rim, opposed longitudinally shiftable members slidably mounted upon the table for movement toward and from each other, mechanical means connected with the members to move them, bars pivotally connected with the members and extending below the same and having parts to engage between the bead of the rim and casing, a vertically disposed screw shaft mounted upon the table above the casing and rim, a nut mounted upon the screw shaft for vertical movement when the screw shaft rotates, vertically swingable arms connected with the nut and extending below the same, curved cleats secured to the bottoms of the arms for engagement about the rim bead when the nut moves upwardly to pull the rim out of the tire casing, a bevelled gear secured to the top of the vertically disposed screw shaft, a horizontal rotatable shaft arranged above the table and rotatably mounted thereon, a second bevelled gear carried by the horizontal rotatable shaft and arranged in permanent mesh with the first-named bevelled gear, and means to facilitate turning the horizontal rotatable shaft.

JAMES I. LARMAN.

No references cited.